United States Patent
Gish

(10) Patent No.: US 8,660,352 B2
(45) Date of Patent: Feb. 25, 2014

(54) QUALITY ASSESSMENT OF IMAGES WITH EXTENDED DYNAMIC RANGE

(75) Inventor: Walter Gish, Oak Park, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 41 days.

(21) Appl. No.: 13/536,785

(22) Filed: Jun. 28, 2012

(65) Prior Publication Data

US 2013/0004074 A1     Jan. 3, 2013

Related U.S. Application Data

(60) Provisional application No. 61/502,757, filed on Jun. 29, 2011.

(51) Int. Cl.
*G06K 9/34*     (2006.01)

(52) U.S. Cl.
USPC .......................................................... 382/173

(58) Field of Classification Search
USPC .................. 382/128, 168, 173, 218
See application file for complete search history.

(56) References Cited

U.S. PATENT DOCUMENTS 5,418,895 A * 5/1995 Lee ................................ 382/168
6,236,751 B1 * 5/2001 Farrell ........................... 382/168

* cited by examiner

*Primary Examiner* — Duy M Dang
(74) *Attorney, Agent, or Firm* — Konstantinos Konstantinides

(57) ABSTRACT

Given a set of two images with visual dynamic range (VDR), wherein the second image is an approximation of the first image, a standard dynamic range (SDR) equivalent peak value (EPV) is computed, wherein the EPV is smaller than the maximum pixel value of the first VDR image. An image assessment metric for the second image is computed using the EPV and an error measurement between the first image and the second image. The EPV may be computed using image statistics (e.g., mean and standard deviation) derived from the first VDR image or, if available, from its corresponding SDR image.

17 Claims, 3 Drawing Sheets

QUALITY ASSESSMENT OF IMAGES WITH EXTENDED DYNAMIC RANGE

CROSS-REFERENCE TO RELATED APPLICATIONS

This application claims priority to U.S. Provisional Patent Application No. 61/502,757 filed Jun. 29, 2011, which is hereby incorporated by reference for all purposes.

TECHNOLOGY

The present invention relates generally to images. More particularly, an embodiment of the present invention relates to the quality assessment of images with extended dynamic range.

BACKGROUND

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the terms extended dynamic range or high dynamic range (HDR) relates to a DR breadth that spans the some 14-15 orders of magnitude of the human visual system (HVS). For example, well adapted humans with essentially normal (e.g., in one or more of a statistical, biometric or opthamological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. Despite the DR differences between HDR and VDR images, as used herein, the term VDR may be used to characterize any image with an extended dynamic range.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

In image processing applications, given two m×n images I and $\hat{I}$, where $\hat{I}$ is considered an approximation of image I, the peak signal to noise ratio (PSNR) is commonly defined as $$PSNR(I, \hat{I}) = 10\log\left(\frac{max_I^2}{MSE(I, \hat{I})}\right) = -10\log\left(\frac{MSE(I, \hat{I})}{max_I^2}\right), \quad (1)$$

where, $$MSE(I, \hat{I}) = \frac{1}{mn}\sum_{i=0}^{m-1}\sum_{j=0}^{n-1}(I(i, j) - \hat{I}(i, j))^2, \quad (2)$$

denotes the mean square error (MSE) between the two images and max$_I$ denotes the maximum possible pixel value in one of the color components of image I. For example, for monochrome images represented with N bits per pixel max=$2^N-1$.

Color images may be represented with multiple color components (e.g., RGB, YCbCr, or similar representations). For color images, a separate PSNR value may be computed for every color component of interest and these values may be added or averaged together. Without loss of generality, and for simplicity and brevity in what follows, quality assessment is described for a single color component of an image in a multi-component representation (e.g., RGB or YCbCr).

In image coding, PSNR is commonly used as a simple, but objective, measure of quality, wherein $\hat{I}$ typically represents a reconstructed approximation of image I, after image I has been coded using an image or video coding algorithm, such as those defined by the joint pictures expert group (JPEG) or the motion pictures experts group (MPEG).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Objective metrics for the quality assessment of images with extended dynamic range are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the quality assessment of images with high, visual, or extended dynamic range. An embodiment receives a set of two images with visual dynamic range (VDR), wherein the second image is an approximation of the first image. A standard dynamic range (SDR) equivalent peak value (EPV or EP value) is computed, wherein said EP value is smaller than the maximum pixel value of the first VDR image. An image assessment metric for the second image is computed using the EP value and an error measurement between the first image and the second image. The EP value may be computed using image statistics (e.g., mean and standard deviation) derived from the first VDR image or, if available, from image statistics from its corresponding SDR image.

In one embodiment, the image assessment metric is computed as the logarithm of the ratio of the square of the EP value over the mean square error between the first and second image.

In another embodiment, the input VDR images are segmented into two sets of sub-images, one set representing SDR-equivalent images (having pixel values lower than the EP value), and the second set representing VDR-highlight images (having pixel values equal or higher than the EP value). Two separate image assessment metrics are computed, one using the EP value and an error measurement between the first set of sub-images, and one using the maximum pixel value in the VDR images and an error measurement between the second set of sub-images. These two metrics may be combined to compute a total image assessment metric.

Example System

Figure 1:
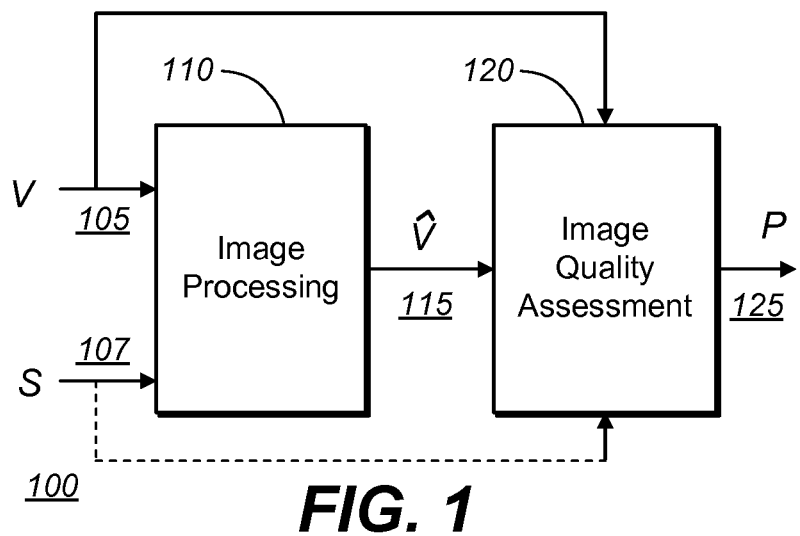
FIG. 1 depicts an image processing system employing an image quality assessment processor according to an embodiment of the present invention.

FIG. 1 depicts an example image processing system 100 employing methods of image quality assessment according to an embodiment of the present invention. Denote as V (105) and S (107) a pair of input VDR and SDR signals that represent the same scene, but at different dynamic ranges. For example, V 105 may represent the output of an HDR capture device (e.g., an HDR camera) after it has been processed and color graded for a VDR display, such as the Dolby Laboratories PRM-4200 professional reference monitor. In some embodiment, V may be represented in 12-bits per color component, e.g., in 4:4:4 RGB color format. In some embodiment, S 107 may represent the same content, but color graded for a HDTV with standard dynamic range. In another embodiment, given input V, SDR signal S may represent the output of a tone mapper processor that maps VDR signals into SDR signals. In an example embodiment, S may be represented in 8-bits per color component, e.g., in 4:2:0 YCbCr color format.

Image processing system 110 operates on signal V (and optionally signal S) and outputs signal $\hat{V}$ 115, an approximation of signal V 105. In an example embodiment, image processing system 100 may represent a lossy video compression process (such as the one described by the MPEG-2 or the MPEG-4 video compression standards) followed by a corresponding image decompression process. Image quality assessment processor 120 receives input signals V 105 and $\hat{V}$ 115 and outputs, according to some image quality assessment criterion, an image quality metric P. As described herein, image quality assessment processor 120 may also receive as input signal S 107.

From equation (1), PSNR represents the mean square error (MSE) scaled by the maximum possible pixel value ($\max_I$). While PSNR works well in applications employing standard dynamic range (SDR) images, differences in the statistical distribution of pixel values between SDR and VDR images necessitate an image quality assessment metric that better matches the signal characteristics of images with extended dynamic range.

Figures 2A, 2B:
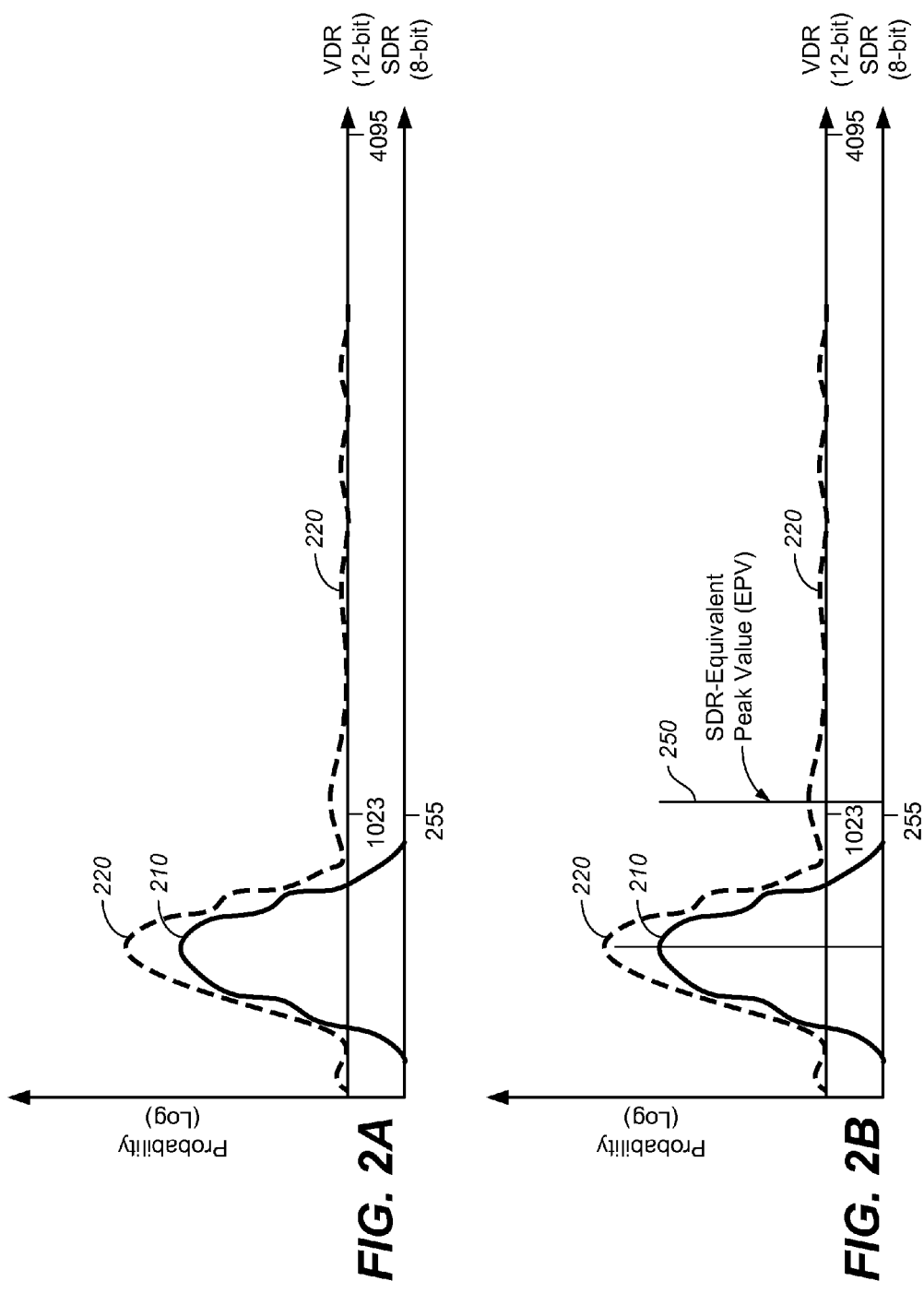
FIG. 2A depicts typical pixel distributions in SDR and VDR images.
FIG. 2B depicts an SDR equivalent peak value (EPV) computed according to an embodiment of this invention.

FIG. 2A depicts example distributions of pixel values in corresponding VDR (220) (e.g., 12-bits per color component), and SDR (210) (e.g., 8-bits per color component) images. As depicted in FIG. 2A, the distribution of pixel values in a typical SDR image 210 is Gaussian-like between the full range of possible values (e.g., for 8-bits pixels, from 0 to 255). In contrast, in a typical VDR image 220, the majority of pixel values may be within a range that is much smaller than the full possible dynamic range. For example, in FIG. 2A, the majority of pixel values are within the range of 0-1023. For VDR images, applying equation (1) with max=$2^N-1$ yields PSNR values that do not truly assess the quality of VDR images as compared with the corresponding SDR image. An example embodiment, in contrast, modifies the PSNR metric to account for the special characteristics of pixel distributions in VDR images, as described herein.

As used herein, the term "SDR-equivalent peak value" (for short, EPV or EP value) relates to a pixel value in the VDR image that can be considered equivalent to the peak value in its corresponding SDR image. In example embodiments, pixel values between 0 and EPV may have a Gaussian-like characteristic, similar to the one observed in SDR images.

FIG. 2B depicts an example of an EP value (250) for a set of VDR (220) and SDR (210) images. Given an EP value, the EPVSNR image quality assessment metric may be defied according to equation (3), below.

$$EPVSNR(V, \hat{V}) = 10\log\left(\frac{EPV^2}{MSE(V, \hat{V})}\right) \quad (3)$$
$$= -10\log\left(\frac{MSE(V, \hat{V})}{EPV^2}\right).$$

Example embodiments for computing the EPV are described next.

Mean Value—Based EPV

In an example embodiment, given a pair of corresponding VDR and SDR images, denoted as V and S respectively, an EP value can be computed as:

$$EPV = \alpha \, mean_V, \quad (4)$$
where
$$\alpha = \frac{max_S}{mean_S} \quad (5)$$

and $mean_V$ and $mean_S$ denote the mean pixel values for V and S respectively.

Given an m×n image I, its mean pixel value may be computed as $$mean_I = \frac{1}{mn}\sum_{i=0}^{m-1}\sum_{j=0}^{n-1} I(i,j). \quad (6)$$

For example, for an 8-bit SDR image component, $max_S=255$. If $mean_S=128$, then $\alpha \approx 2$.

From equations (3) and (4), a scaled mean EPVSNR (for simplicity, denoted as $EPVSNR_{sm}$) may be computed as $$EPVSNR_{sm}(V, \hat{V}) = 10\log\left(\frac{(\alpha \, mean_V)^2}{MSE(V, \hat{V})}\right). \quad (7)$$

In an example embodiment, when a corresponding SDR image may not be available, the value of $\alpha$ in equation (7) may be substituted by a suitable constant (e.g., $\alpha=2$). For example, under the assumption that $\alpha=1$ ($EPV=mean_V$), the quality of a processed image can be computed using $$EPVSNR_m(V, \hat{V}) = 10\log\left(\frac{mean_V^2}{MSE(V, \hat{V})}\right). \quad (8)$$

Mean Value and Variance Value Based EPV

A more accurate EP value may be obtained by taking into consideration both the mean and the variance (or standard deviation) of the input SDR and VDR images. Denote as $$\beta = \frac{max_S - mean_S}{\sigma_S}, \quad (9)$$

where $\sigma_S$ denotes the standard deviation of the SDR input S. An EP value may be computed as $$EPV=mean_V+\beta\sigma_V, \quad (10)$$

where $mean_V$ denotes the mean value of V and $\sigma_V$ denotes the standard deviation of V. Then, from equation (3), a quality metric for $\hat{V}$ may be computed as $$EPVPSNR(V, \hat{V}) = 10\log\left(\frac{(mean_V + \beta\sigma_V)^2}{MSE(V, \hat{V})}\right). \quad (11)$$

For an m×n image I, its standard deviation may be computed as the square root of its variance $$\sigma_I^2 = \frac{1}{mn}\sum_{i=0}^{m-1}\sum_{j=0}^{n-1}(I(i,j) - mean_I)^2, \quad (12)$$

where $mean_I$ may be computed using equation (6).

In an example embodiment, when a corresponding SDR image may not be available, the value of $\beta$ in equations (10) and (11) may be substituted by a suitable constant (e.g., $\beta=3$). Such a constant may be computed by collecting statistics among a plurality of known SDR and VDR data sets and may be used in lieu of the parameters computed in equation (9).

Figure 3:
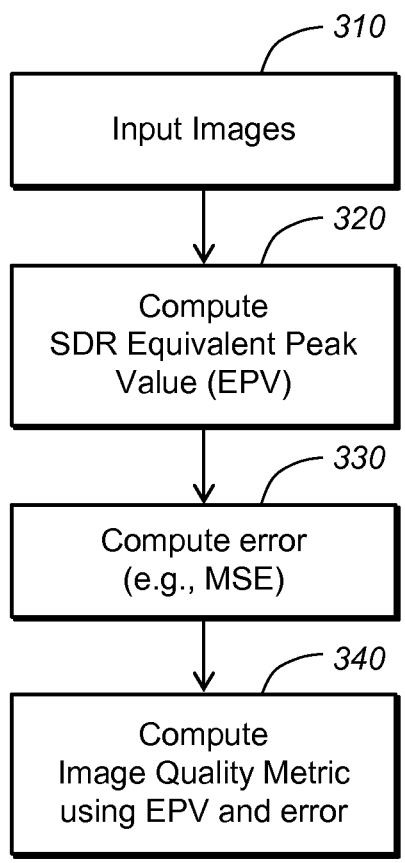
FIG. 3 depicts an example data flow for computing an image quality assessment metric according to an embodiment of the present invention.

FIG. 3 depicts an example data flow for computing an image assessment metric according to an embodiment. In step 310, given a set of input images (e.g., V 105, S 107, and $\hat{V}$ 115), the SDR-equivalent peak value (EPV) is computed according to a EPV-computation metric, e.g., equations (4) or (10). The error between the two images under consideration (e.g., V 105 and $\hat{V}$ 115) is also computed under an error metric, e.g., the MSE criterion of equation (2). Given the computed EPV and error values, an image quality assessment metric (e.g., EPVSNR of equation (11)) may be computed.

Figure 4:
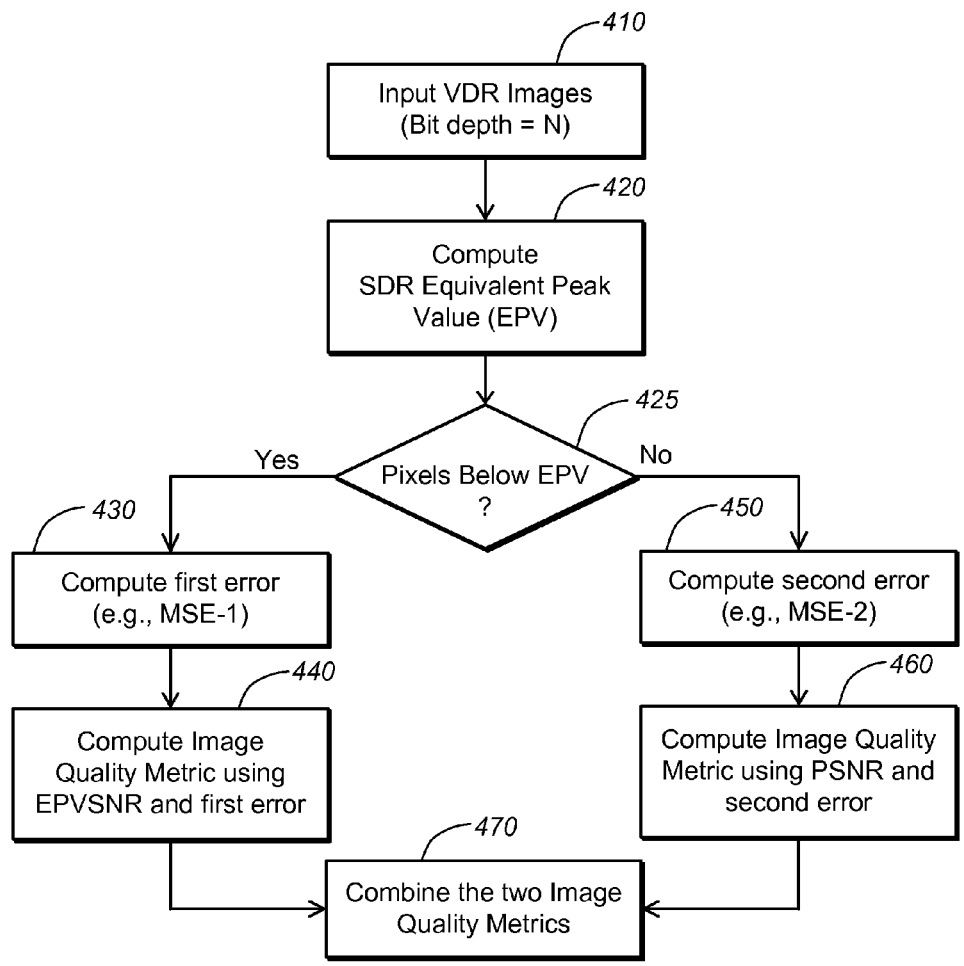
FIG. 4 depicts an example data flow for computing an image quality assessment metric, using image segmentation, according to an embodiment of the present invention.

Preserving as much as possible both the VDR highlights and the near-black gradations can be significant in VDR related image processing. FIG. 4 depicts an example data flow for computing an image assessment metric according to another embodiment of this invention. According to FIG. 4, a VDR image may be segmented into two sub-images: a first sub-image comprising the pixels of the original image for which pixel values are below an EP value, and a second sub-image comprising the remaining pixel values of the original image, that is, those with pixel values above the EP value. The first sub-image may be considered to represent an SDR-equivalent image. The second sub-image may be considered to represent a VDR-highlights image.

From FIG. 4, in step 410, given a set of input images (e.g., V 105, S 107, and $\hat{V}$ 115), the SDR-equivalent peak value (EPV) is computed according to an EPV-computation metric, e.g., equations (4) or (10). Following step 425, pixels in image V and $\hat{V}$ may be segmented into two sets of sub-images. The first set of sub-images (e.g., $V_1$ and $\hat{V}_1$) comprise of the pixels of the original images for which pixels values in V are below the EP value. The second set of sub-images (e.g., $V_2$ and $\hat{V}_2$) comprise the remaining pixels. In steps 430 and 440 one may compute the image quality metric for the first sub-image $\hat{V}_1$ according to any of the EPV-based metrics described earlier, e.g., one may compute $EPVSNR(V_1, \hat{V}_1)$ as in equation (11). In steps 450 and 460 one may compute the image quality metric for the second sub-image $\hat{V}_2$ using a traditional image quality assessment metric, e.g., PSNR $(V_2, \hat{V}_2)$ of equation (1). The two quality metrics can be used separately, or they can be combined into a single quality metric.

In an example implementation, for a VDR images represented with N bits per color component, wherein N represents an integer and N>8, total SNR ($EPVSNR_T$) may be computed as:

$$EPVSNR_T=EPVSNR(V_1, \hat{V}_1)+cPSNR(V_2, \hat{V}_2), \quad (13)$$

wherein c represents a constant. In an embodiment, $EPVSNR(V_1, \hat{V}_1)$ may be computed using equation (11) and PSNR $(V_2, \hat{V}_2)$ may be computed using equation (1) with $max=2^N-1$. The $PSNR(V_2, \hat{V}_2)$ term can be interpreted as a metric representing how well the highlights in the original image (e.g., V) were preserved; hence the constant c may represent a measure of the importance of preserving these highlights.

In some embodiments of the present invention, an image may be segmented into more than two sub-images. For example, an embodiment segments the image into three or more sub-images. In an example embodiment, in addition to an EPV threshold, given the mean and variance of the VDR image, a low-black threshold may be defined, which is between 0 and its mean value, e.g., $$\text{Low-black threshold}=mean_V-\beta\sigma_V. \quad (14)$$

Then, similarly to the process depicted in FIG. 4, three or more quality assessment metrics may be computed and combined.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to image quality assessment, such as those described herein. The computer and/or IC may compute any of a variety of parameters or values that relate to image quality assessment as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement image quality assessment methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to image quality assessment of images with expanded dynamic range are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for assessing the image quality of images with visual dynamic range (VDR), comprising:
   receiving a first VDR image and a second VDR image, each comprising a plurality of pixel values, wherein the second image is an approximation of the first image;
   computing a standard dynamic range (SDR) equivalent peak value (EPV) for the first image, wherein said EPV is smaller than the maximum pixel value for the first image;
   computing an error measurement between the pixel values of the first image and the second image; and
   computing an image quality assessment metric for the second VDR image using the EPV and the error measurement.

2. The method of claim 1, wherein computing the error measurement comprises computing the mean square error (MSE) between the pixel values of the first image and the corresponding pixel values of the second image.

3. The method of claim 1, wherein computing the EPV comprises:
   computing a mean of the pixel values in the first image; and
   multiplying the mean with a first scaling factor.

4. The method of claim 3, further comprising:
   receiving a standard dynamic range (SDR) image, wherein said SDR image comprises a plurality of pixels and represents the same scene as the first image but at a lower dynamic range;
   computing a mean of the pixel values in the SDR image;
   computing the first scale factor as the ratio of the maximum pixel value in the SDR image over the mean of the SDR image.

5. The method of claim 3 wherein the first scaling factor comprises a value that is approximately equal to 2.

6. The method of claim 1, wherein computing the EPV comprises:
   computing a mean of the pixel values in the first image;
   computing a standard deviation of the pixel values in the first image;
   generating a product by multiplying the standard deviation of the first image with a second scaling factor; and
   adding the mean of the first image to said product.

7. The method of claim 6, wherein the second scaling factor comprises a value that is approximately equal to 3.

8. The method of claim 6, further comprising:
   receiving a standard dynamic range (SDR) image, wherein said SDR image comprises a plurality of pixels and represents the same scene as the first image but at a lower dynamic range;
   computing a mean of the pixel values in the SDR image;
   computing a standard deviation of the pixel values in the SDR image;
   computing a difference between the maximum pixel value in the SDR image and the mean value of the SDR image;
   computing the second scale factor as the ratio of said difference over the standard deviation of the SDR image.

9. A method for assessing the image quality of images with visual dynamic range (VDR), comprising:
   receiving a first VDR image and a second VDR image, each comprising a plurality of pixel values, wherein the second image is an approximation of the first image;
   computing an SDR equivalent peak value (EPV) for the first image, wherein said EPV is smaller than the maximum pixel value for the first image;
   segmenting the first image into a first sub-image and a second sub-image, wherein the first sub-image comprises those pixels of the first image for which pixel values are lower than the EPV, and the second sub-image comprises the remaining pixels of the first image, not included in the first sub-image;

segmenting the second image into a third sub-image and a fourth sub-image, wherein the third sub-image comprises those pixels for which corresponding pixels of the first image have pixel values lower than the EPV, and the fourth sub-image comprises the remaining pixels of the second image, those not included in the third sub-image;

computing a first error measurement between the pixel values of the first sub-image and the third sub-image;

computing a second error measurement between the pixel values of the second sub-image and the fourth sub-image;

computing a first image assessment metric for the third sub-image using the EPV and the first error measurement; and computing a second image assessment metric for the fourth sub-image using the maximum pixel value of the first image and the second error measurement.

10. The method of claim 9, further comprising:
combining the first image assessment metric with the second image assessment metric to compute a total image assessment metric for the second image.

11. The method of claim 9, wherein the combining step comprises adding the first image assessment metric to a product, wherein said product comprises multiplying the second image assessment metric with a constant.

12. The method of claim 1, wherein computing the image assessment metric comprises computing a ratio of the square of the EPV over the error measurement.

13. The method of claim 12 further comprising computing the logarithm of the ratio.

14. An apparatus comprising a processor and configured to perform the method of claim 1.

15. An apparatus comprising a processor and configured to perform the method of claim 9.

16. A non-transitory computer-readable storage medium having stored thereon computer-executable instruction for executing a method with a computer in accordance with claim 1.

17. A non-transitory computer-readable storage medium having stored thereon computer-executable instruction for executing a method with a computer in accordance with claim 9.

* * * * *